(12) United States Patent
Falkenborg

(10) Patent No.: US 7,093,632 B1
(45) Date of Patent: Aug. 22, 2006

(54) DUAL-WHEEL VALVE STEM STABILIZING CLIP

(76) Inventor: William C. Falkenborg, 7317 Foothill Blvd., Tujunga, CA (US) 91042

( * ) Notice: Subject to any disclaimer, the term of this patent is extended or adjusted under 35 U.S.C. 154(b) by 73 days.

(21) Appl. No.: 10/871,956

(22) Filed: Jun. 21, 2004

(51) Int. Cl.
*B60C 29/02* (2006.01)

(52) U.S. Cl. ......... 152/427; 152/DIG. 8; 152/DIG. 13; 301/5.24

(58) Field of Classification Search ............... 152/427, 152/DIG. 13, DIG. 8, 429; 301/5.24, 37.28; 137/233
See application file for complete search history.

(56) References Cited

U.S. PATENT DOCUMENTS

| | | | | |
|---|---|---|---|---|
| 1,697,814 A | * | 1/1929 | Forbes | 16/2.1 |
| 2,631,065 A | * | 3/1953 | Borodie | 301/5.24 |
| 3,039,510 A | * | 6/1962 | Cardi | 152/427 |
| 3,106,953 A | * | 10/1963 | Baxa | 152/427 |
| 3,939,894 A | * | 2/1976 | Curtis | 152/427 |
| 5,313,997 A | * | 5/1994 | Bias et al. | 152/427 |
| 5,922,152 A | * | 7/1999 | Patti | 152/427 |
| 6,705,369 B1 | * | 3/2004 | Russell et al. | 152/427 |

* cited by examiner

*Primary Examiner*—Frantz F. Jules
(74) *Attorney, Agent, or Firm*—Albert O. Cota

(57) ABSTRACT

A dual-wheel valve stem stabilizing clip (20) that is used for immobilizing a reverse-mounted valve (40) mounted on dual truck wheels (28). The clip consists of pair of U-shaped spring brackets (22), with each including an S-shaped outer distal end (24). The brackets are positioned on top of each other with the outer distal ends at opposite extremities. A number of adjustment holes (26) in each bracket align together to permit a variation in overall length. A spring doubler shim (32) that is configured in a U-shape and is sandwiched on top of each spring bracket to provide additional rigidity to the spring brackets. A valve stem cushion (38) is compressed within brackets and shims and receives and secures the valve on an inner wheel of dual truck wheels. Threaded fasteners attach the brackets and shims together to form a clip capable of being manually bent in an arc shape and snapped into a hand hole (30) of an outer truck wheel rim in order to stabilize the valve stem installed on an inner truck wheel rim.

15 Claims, 6 Drawing Sheets

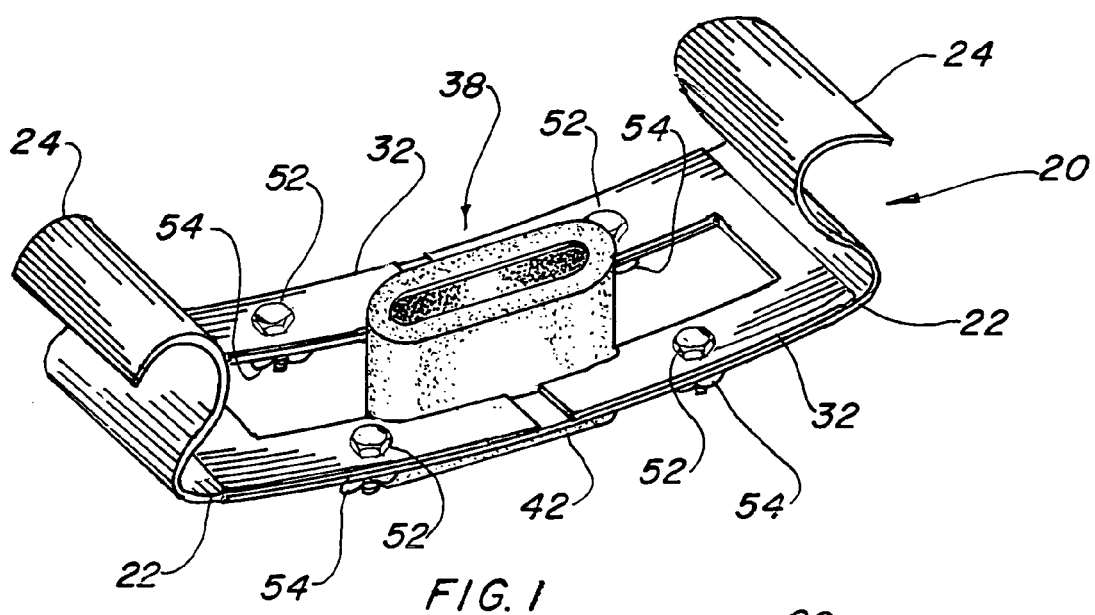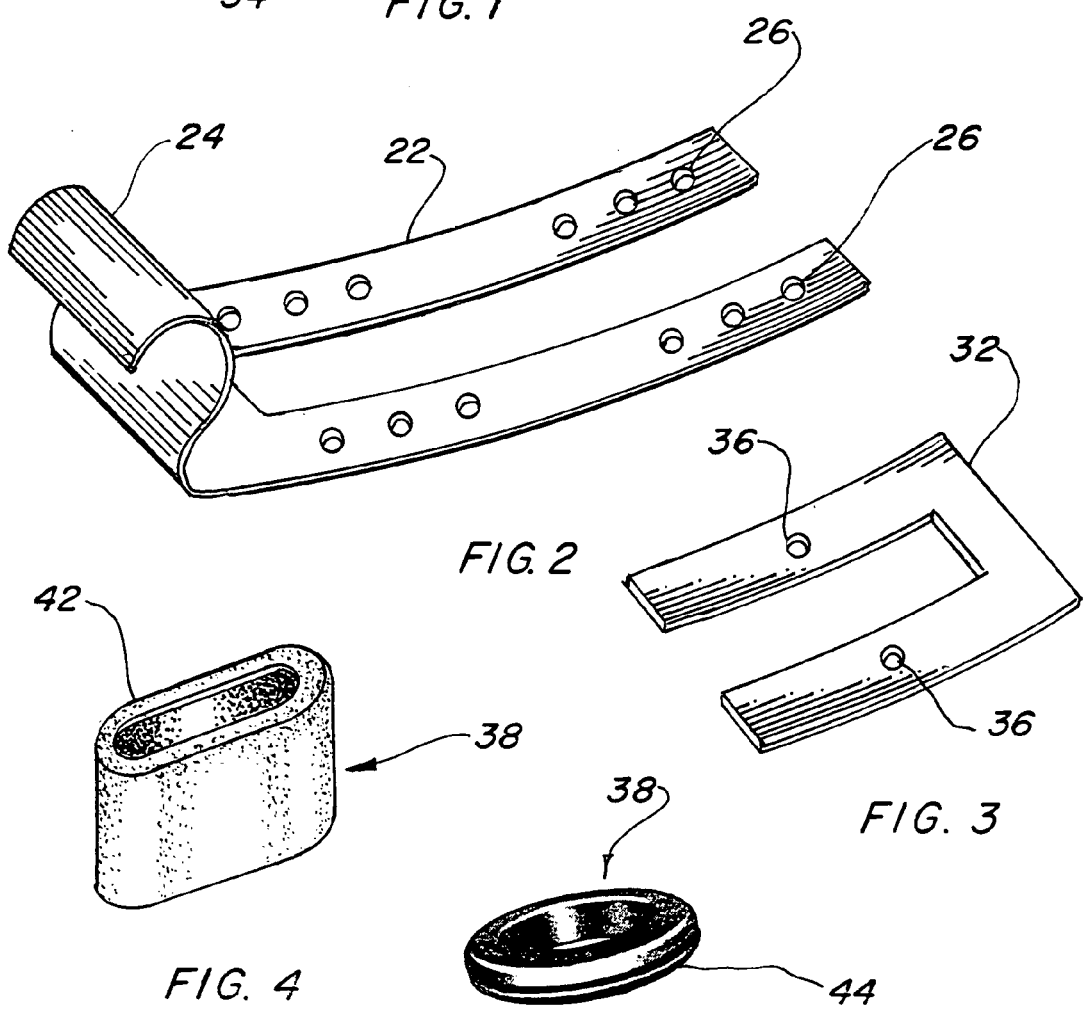

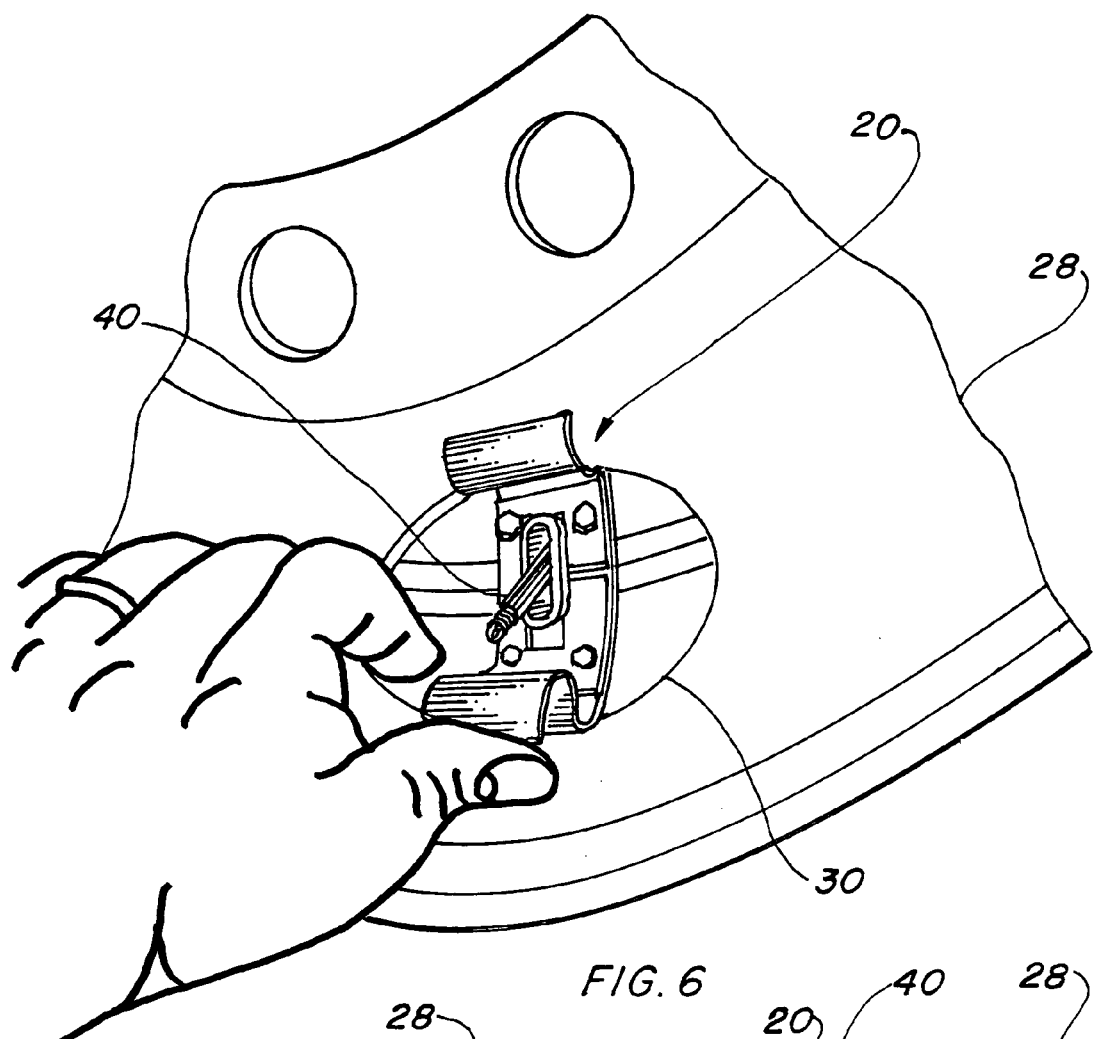
FIG. 6
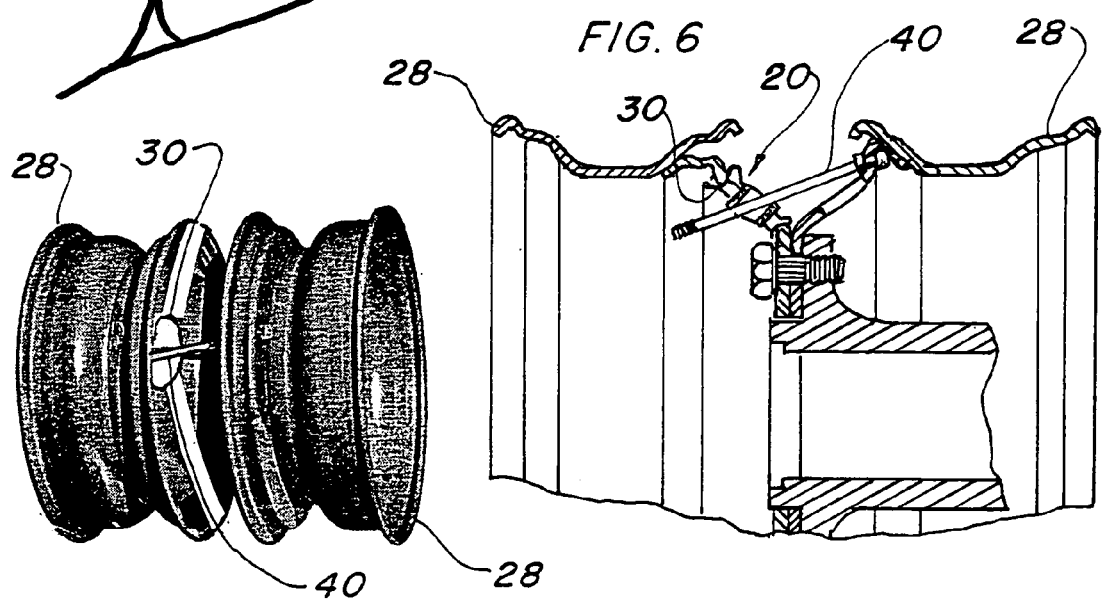
FIG. 7
FIG. 8

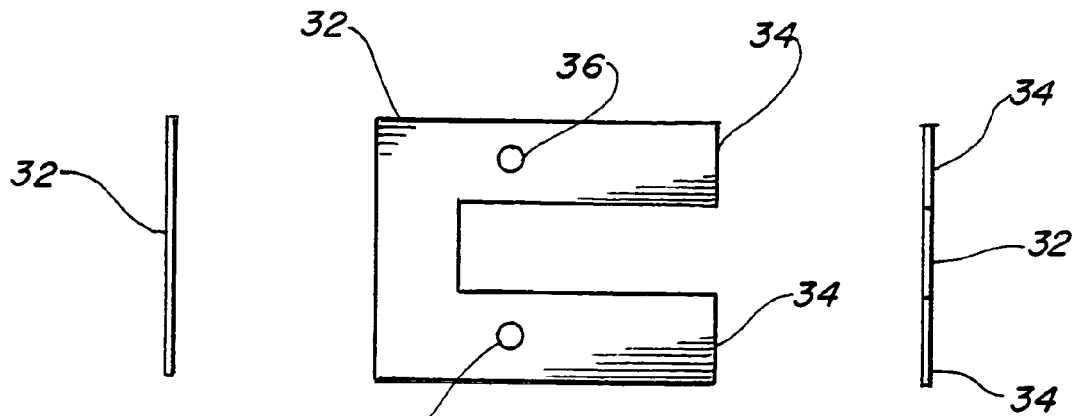
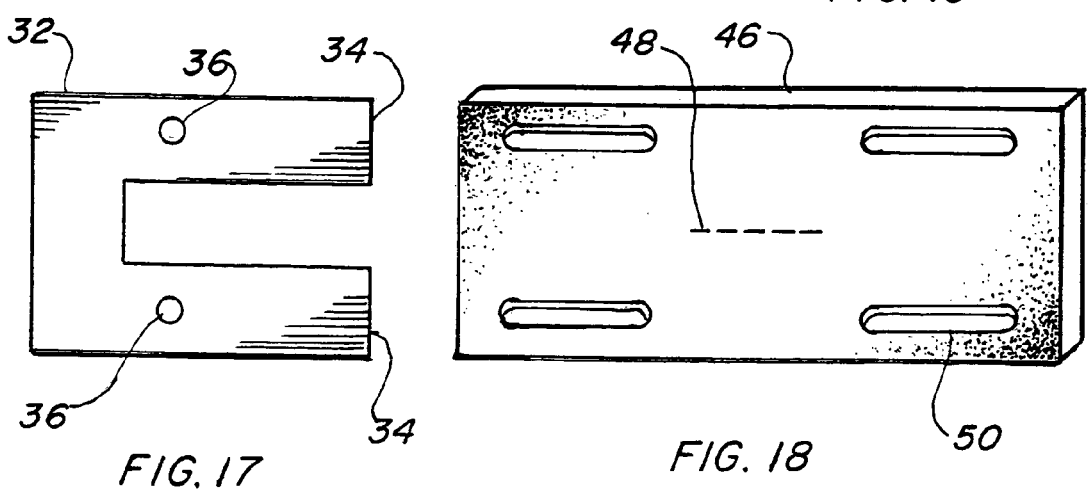
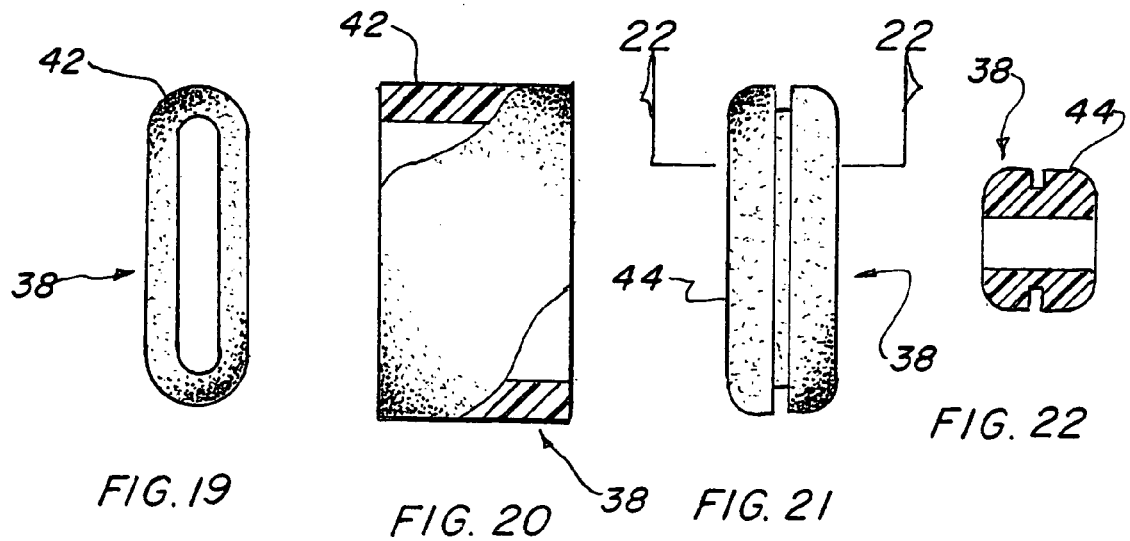

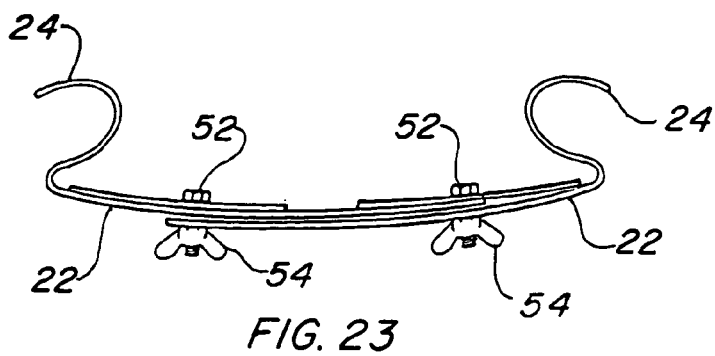
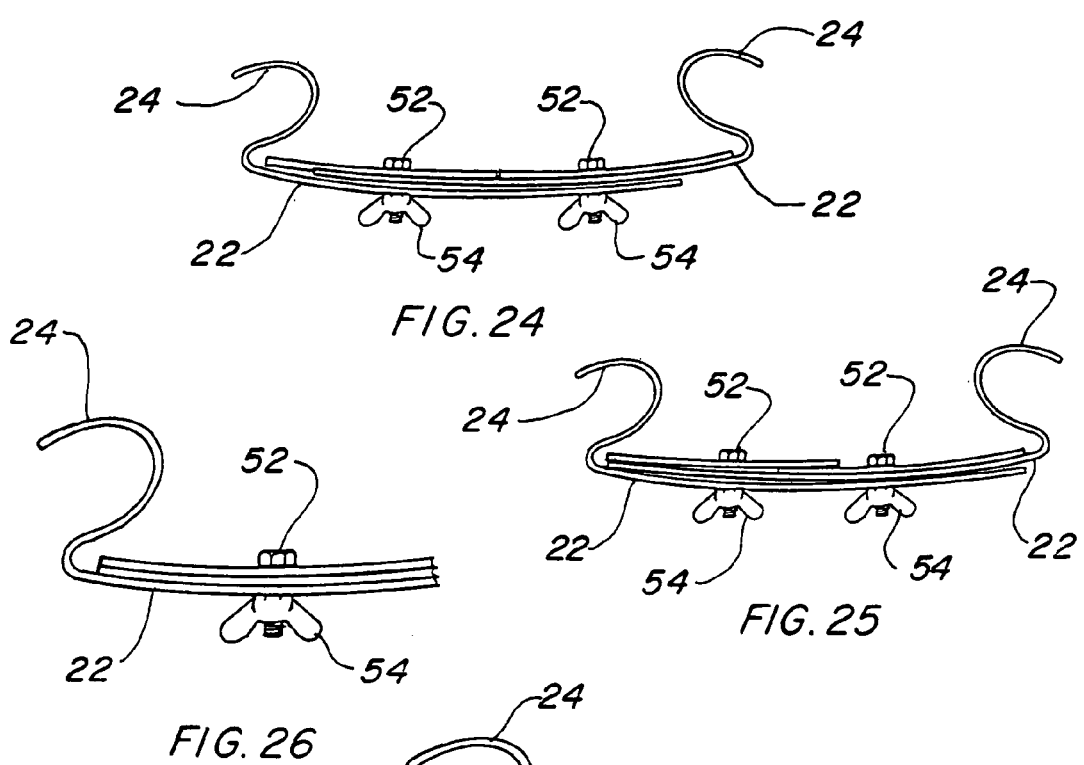
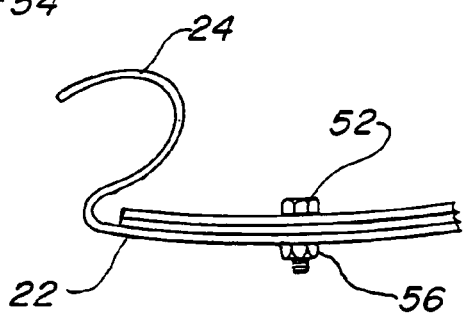
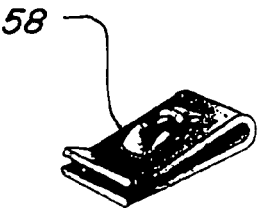
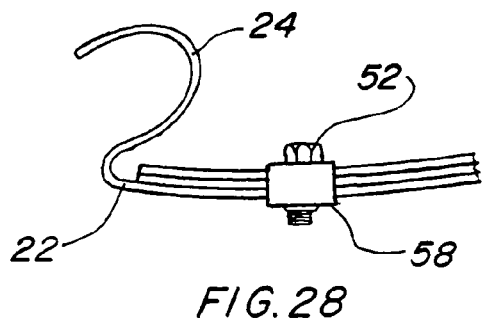

DUAL-WHEEL VALVE STEM STABILIZING CLIP

TECHNICAL FIELD

The invention generally pertains to dual-wheel truck, tire inflation systems, and more specifically to a valve stem stabilizing clip for immobilizing the rear wheel valve stem in truck dual wheels.

BACKGROUND ART

Previously, many types of systems have been used to provide an effective means for accessing the rear wheel valve stem in a truck dual-wheel application or for providing a system that eliminates the need for extended valve stems.

A search of the prior art did not disclose any patents that possess the novelty of the instant invention; however the following U.S. patents are considered related:

Moore in U.S. Pat. No. 4,398,574 teaches a method of inflating the inner tire of dual pneumatic wheels using a valve extender. The valve extender is easily attached or detached, and also incorporates a coupling on one end which grips the wheel valve stem, and a connector on the other end for engaging the air supply hose.

U.S. Pat. No. 5,244,027 issued to Freigang is for a tire pressure control system for wheels of a motor vehicle. The system utilizes a compressed air control system and a vacuum negative pressure system with a control system for valves that vent and pressurize tires.

Beverly et al. in U.S. Pat. No. 5,253,687 also discloses a tire pressure control system for wheels of a vehicle. The system similarly utilizes a compressed air control system and a vacuum negative pressure system with a control system for valves that vent and pressurize tires.

Beverly et al. in U.S. Pat. No. 5,273,064 is a divisional patent for the above application of Beverly et al.

U.S. Pat. No. 5,429,167 issued to Jensen is for a central tire inflation system that is utilized basically for tractor trailer rigs. The system requires no modification to wheel hubs or axle tubes, with communication provided between an air reservoir through the axle hub and a spindle sleeve. A chamber includes a spindle hum, a hub cover, a rotary seal and a spindle sleeve attached to a nut. A control system includes a plurality of multi-port two-way pneumatic valves.

For background purposes and as indicative of the art to which the invention is related reference may be made to the remaining cited patent issued to Ford in U.S. Pat. No. 4,275,622.

DISCLOSURE OF THE INVENTION

In the past, there have been many attempts to shape or extend valve stems on dual truck wheels to make them easily accessible when performing the initial inflation pressure to the tire and also when checking the tire pressure. It is apparent that one of the most successful attempts is the use of an extended or so-called reverse-mounted valve stem which is mounted on an inner wheel rim. The valve stem may have a slight bend, such as 23 degrees, which facilitates alignment through a hand hole located in the inner wheel rim. With this system, the outer wheel uses a relatively conventional valve stem which penetrates one of the hand holes in the outer wheel. While this approach has been well received and accomplishes its purpose admirably, the reverse mounted valve is particularly long and cantilevered, as well as unsupported, which may lead to premature metal fatigue and failure when subjected to stress, shock and vibration.

Therefore, the primary object of the invention is to support a reverse-mounted valve using a wheel-stem stabilizing clip installed in one of the hand holes in the outer wheel. The clip is configured to fit into the hand hole and remain secured in place by its snap-in feature. While any dual truck wheel assembly may be enhanced by the invention, the utility is extensively desirable in the motor home industry, where checking tire pressure on a motor home must be convenient. This requirement is critical when compressed air service is available at service stations and a motor home driver may not be specifically trained or find it convenient to reach into a tight space to locate and check or inflate the tire through a conventional valve stem. Further, the driver usually does not have the specialized compressed air tools that are available to many trucking companies and larger commercial stations that cater to dual-tired rigs. An important object of the invention is that a stabilizing clip grips the stem with a resilient material, such as a section of synthetic rubber hose or a rubber grommet. This gripping action is particularly useful, as the stem is mounted with a rubber washer that permits a very limited amount of movement in the stem itself. The clip stabilizes the stem without placing unnecessary stress on the stem parent material or interface junction.

Another object is that the resilient material of the valve stem cushion of the invention is flexible enough to grip the stem diagonally, thus permitting a relatively large compressive area since the hand hole in the wheel may not necessarily be located at right angles to the stem.

Still another object of the invention is that the clip is adjustable in length to accommodate the different size hand holes of conventional truck wheels, such as the 19.5 inch and 22.5 inch diameter. Also, an adjustment is necessary as some wheels have 2, 4 or even 5 hand holes according to the manufacturer, thereby making the hole size non-standard in the industry.

Yet another object of the invention is that the adjustment may be made either in the field, or it has been found that three adjustment lengths accommodate almost all of the available wheel sizes which include 2.76 inches (70 mm), 3.23 inches (82 mm) and 3.46 inches (88 mm). Therefore, the clip may be adjusted by the manufacturer and marked for the appropriate wheel make and size, with the possibility of easy adjustment in the field.

A further object of the invention is the simplicity of design, as the clip may be manufactured using a minimum of parts and formed with conventional tooling with only simple inexpensive steel rule dies necessary for the specific stamped parts. As such, the clip may be reasonably priced and within the reach of all.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the dual-wheel valve stem stabilizing clip in the preferred embodiment.

FIG. 2 is a partial isometric view of the spring bracket in the preferred embodiment.

FIG. 3 is a partial isometric view of the doubler shim in the preferred embodiment.

FIG. 4 is a partial isometric view of the valve stem cushion in the preferred variation.

FIG. 5 is a partial isometric view of the valve stem cushion in another variation specifically a conventional grommet.

FIG. 6 is a partial isometric view of the dual-wheel valve stem stabilizing clip being manually installed in the outer truck wheel.

FIG. 7 is a partial isometric view of a pair of typical dual-wheels butted together with a reverse mounted valve installed in place on the inner wheel and with the stem positioned through the hand hole of the outer wheel.

FIG. 8 is a cross-sectional view of a pair of typical dual-wheels attached together with lug bolts, with the reverse mounted valve in place on the inner wheel rim and with the stem positioned through the hand hole of the outer wheel and the reverse mounted valve stem supported by the invention.

FIG. 14 is a left side view of the doubler shim in the preferred embodiment.

FIG. 15 is a plan view of the doubler shim in the preferred embodiment.

FIG. 16 is a right side view of the doubler shim in the preferred embodiment.

FIG. 17 is a bottom view of the doubler shim in the preferred embodiment.

FIG. 18 is an isometric view of the valve stem cushion in the resilient pad embodiment variation.

FIG. 19 is an end view of the valve stem cushion in the preferred embodiment.

FIG. 20 is a cut away side view of the valve stem cushion in the preferred embodiment.

FIG. 21 is a side view of the valve stem cushion in the grommet embodiment variation.

FIG. 22 is a cross-sectional view taken along lines 22—22 of FIG. 21.

FIG. 23 is a side view of the dual-wheel valve stem stabilizing clip with the doubler clips installed with a gap between the ends.

FIG. 24 is a side view of the dual-wheel valve stem stabilizing clip with the doubler clips installed with the ends butted together.

FIG. 25 is a side view of the dual-wheel valve stem stabilizing clip with the doubler clips installed overlapping the ends.

FIG. 26 is a partial side view of the dual-wheel valve stem stabilizing clip with the doubler clips installed, and attached with threaded fasteners in the form of a cap screw and wing nut.

FIG. 27 is a partial side view of the dual-wheel valve stem stabilizing clip with the doubler clips installed, and attached with threaded fasteners in the form of a cap screw and hex nut.

FIG. 28 is a partial side view of the dual-wheel valve stem stabilizing clip with the doubler clips installed, and attached with threaded fasteners in the form of a cap screw and a spring steel U-nut.

FIG. 29 is a partial isometric view of the spring steel U-nut illustrated completely removed from the invention for clarity.

BEST MODE FOR CARRYING OUT THE INVENTION

Figure 9:
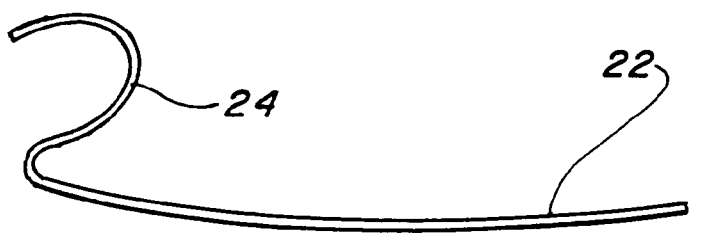
FIG. 9 is a side view of the spring bracket in the preferred embodiment.
Figure 10:
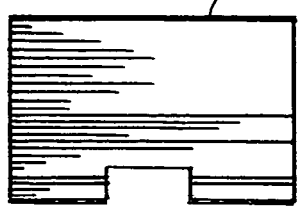
FIG. 10 is a right side view of the spring bracket in the preferred embodiment.
Figure 11:
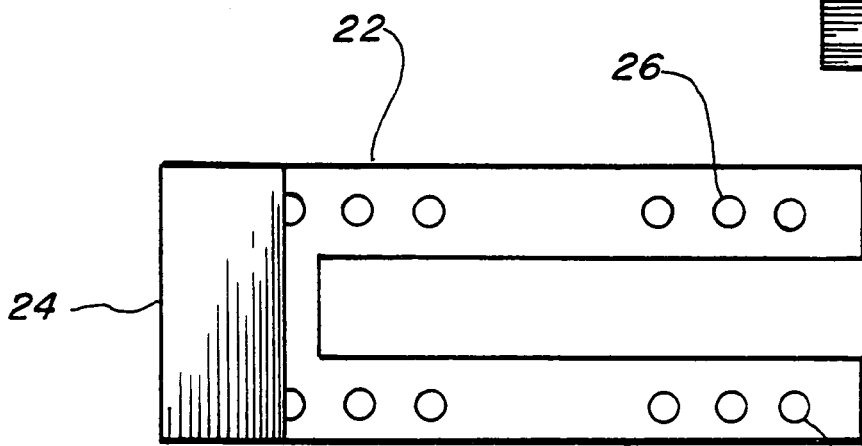
FIG. 11 is a plan view of the spring bracket in the preferred embodiment.
Figure 12:
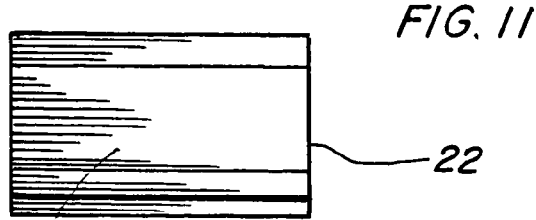
FIG. 12 is a left side view of the spring bracket in the preferred embodiment.
Figure 13:
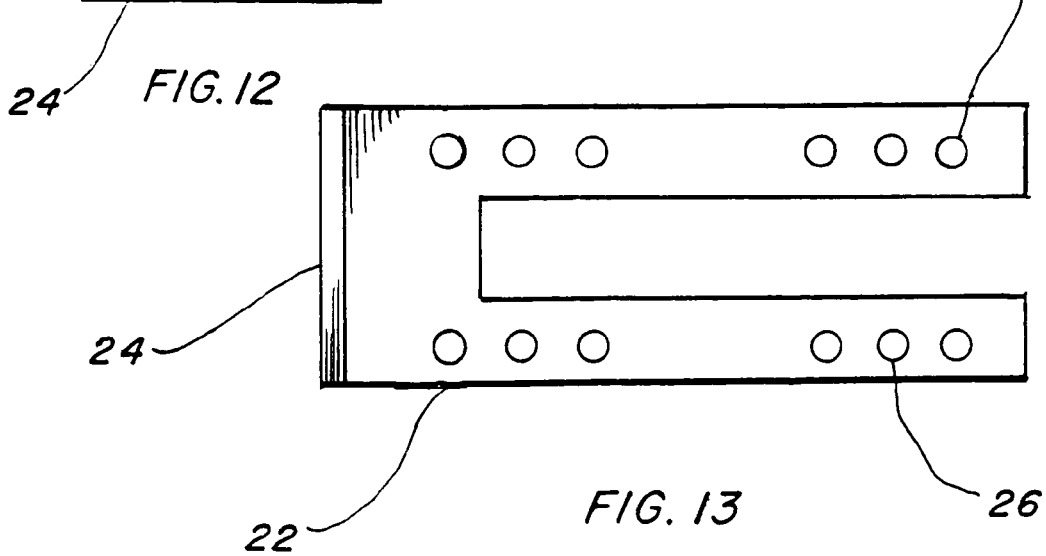
FIG. 13 is a bottom view of the spring bracket in the preferred embodiment.
Figure 30:
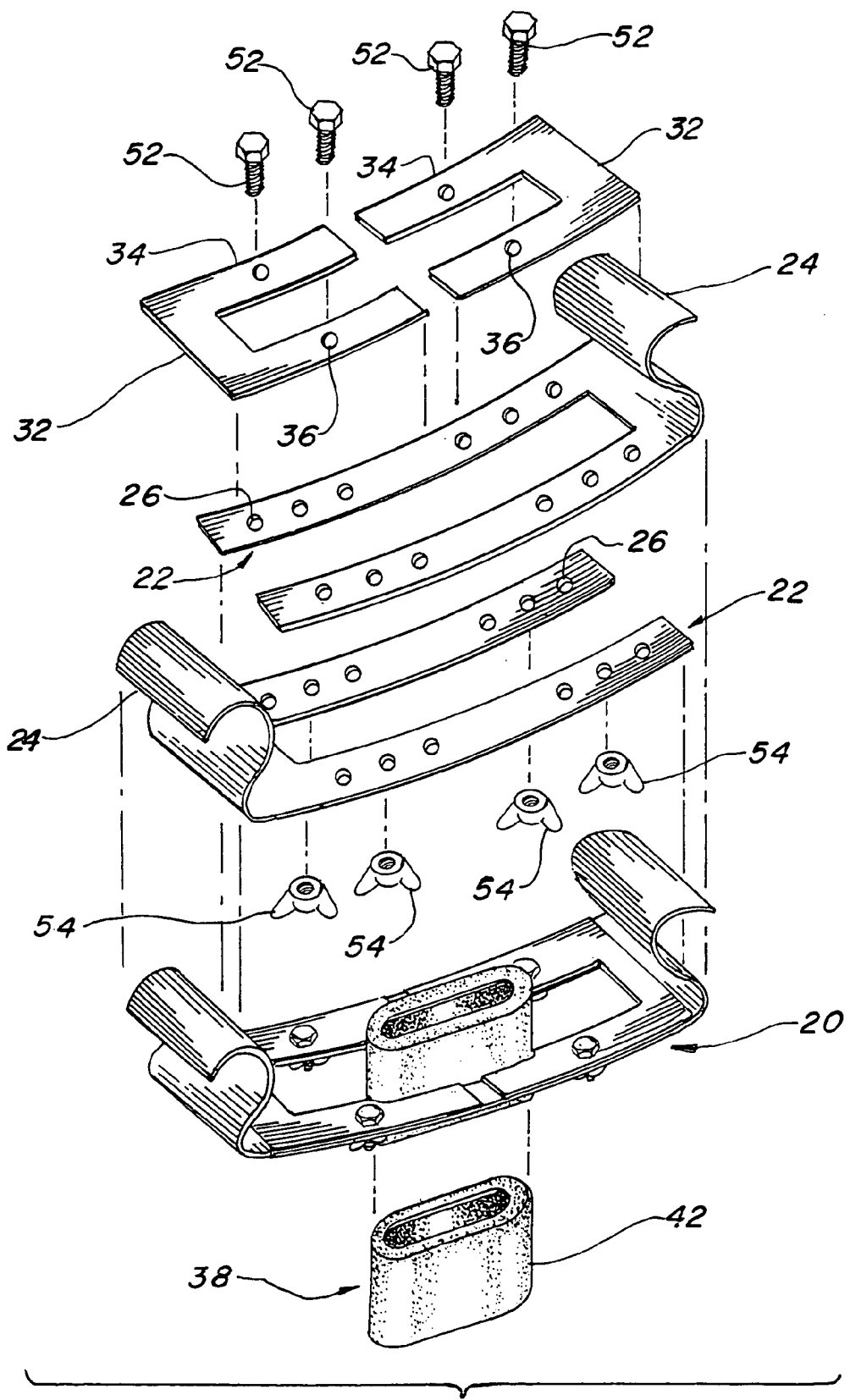
FIG. 30 is an exploded partial isometric view of the dual-wheel valve stem stabilizing clip in the preferred embodiment.

The best mode for carrying out the invention is presented in terms of a preferred embodiment for a dual-wheel valve stem stabilizing clip 20 which functions to immobilize a reverse mounted valve that is used on dual truck wheels. The preferred embodiment, as shown in FIGS. 1 through 30, is comprised of a pair of U-shaped spring brackets 22. Each bracket is configured to have an S-shaped outer distal end 24, as shown in FIGS. 2 and 9–13. The brackets 22 are preferably fabricated of spring steel, from 0.020 inch (0.050 cm) to 0.030 inch (0.076 cm) thick material, with a black oxide finish. In order to have a snap-in feature and be adjustable, the brackets 22 are juxtapositioned on top of each other with the outer distal ends 24 opposed, as shown in FIGS. 1 and 30.

Each bracket 22 includes a plurality of adjustment holes 26 therethrough, that permit the holes 26 to align when placed together, thus achieving the desired variation in overall length. The adjustment holes 26 are preferably equally spaced therebetween to permit the length adjustment to be made, however any number and spacing of the holes may be utilized with equal ease.

It should be noted that the brackets 22 are illustrated with a slight concave surface or radial bend on the extending ends opposite the S-shape distal ends 24. Additionally, the extending ends may be flat and the bend may be made when the valve stem stabilizing clip 20 is manually snapped into a truck wheel 28 hand hole 30, as illustrated in FIG. 6.

A spring doubler shim 32 is configured in a U-shape having extending legs 34, as shown in FIGS. 3 and 14–18. The shim 32 is sandwiched on top of each spring bracket 22 adjacent to the S-shaped outer distal end 24. The shim 32 includes a single mounting hole 36 in each leg 34 that is positioned to interface with a specifically selected spring bracket adjustment hole 26, thereby permitting the valve stem stabilizing clip 20 to be adjusted to the desired length to fit a specific truck wheel 28 and for providing additional rigidity to the spring brackets 22. Each spring doubler shim 32 is preferably fabricated of spring steel, from 0.020 inch (0.050 cm) to 0.030 inch (0.076 cm) thick material, and having a black oxide finish, however other materials, thickness and finishes may also be used.

The shims 32 may be assembled in three specific positions to accommodate the most popular wheel sizes, as illustrated in FIGS. 23–25. These positions are defined as having the shim legs 34 separated from each other when sandwiched on top of each spring bracket 22, as shown in FIG. 23; butted together, as shown in FIG. 24; or overlapped on top of each other, as shown in FIG. 25. Assembly of the shims 32 and brackets 22 may be accomplished by the manufacturer or the parts may be packaged to be assembled by an end user since different types of wheels have diverse numbers and sizes of hand holes 30.

A valve stem cushion 38 is compressed within the combined spring brackets 22 and the gap between the legs 34 of the shim 32 that have been sandwiched on top of the brackets 22. The cushion 38 is used to tightly receive and secure a reverse-mounted valve 40 that has been mounted on the inner wheel 28 of a set of dual truck wheels. The valve stem cushion 38 may consist of a hose 42 cut into a short section, as shown in FIGS. 1 and 30, and is squeezed together sufficiently to fit in-between the legs of the brackets 22 and shims 32. The hose 42 may be made of any resilient material suitable for the purpose and environment.

An alternate cushion 38 may be a grommet 44, as shown in FIGS. 5, 21 and 22, which may be specifically fabricated for the application or a standard configuration that is readily available. In either design, the cushion 38 is sized with an internal width that is the nominal size of the reverse-mounted valve 40 or slightly smaller to assure a snug fit. It should also be noted that the inside spacing of the cushion 38 is an oblong slot which provides angular engagement of the valve 40. This is important because the position of the clip 20 and valve 40 are not necessarily at right angles to each other dependent upon the wheel 28 configuration and location of the hand holes 30.

Another variation of the embodiment of the valve stem cushion 38, as shown in FIG. 18, consists of a resilient pad 46 that compressed by attachment means on top of the brackets 22 and shims 32. The pad has a slit 48 cut into the center for gripping the reverse-mounted valve 40 when it penetrates the pad 46. The interface of the valve 40 with the pad 46 is not illustrated, however it is obvious to one skilled in the art as to its location and functional utility. In order to maintain adjustability, the pad 46 utilizes four slots 50 in the corners that line up with the adjustment holes 26 and mounting holes 36.

A plurality of threaded fasteners attach the spring brackets 22 and shims 32 together to form the clip 20, as shown in FIGS. 1 and 30. The threaded fasteners preferably consist of a cap screw 52 and wing nut 54, as depicted in FIGS. 1, 23–26 and 30. The use of a wing nut 54 allows the clip 20 to be easily assembled or modified in the field, however the wings should remain parallel to the legs 34 when the assembly is completed.

Optionally, the threaded fastener maybe a cap screw 52 and a hex nut 56, as shown in FIG. 27, which is in common usage, however two separate tools are necessary to tighten the fasteners together securely. Further, the threaded fasteners may also comprise a cap screw 52 and a spring steel U-nut 58, as shown in FIGS. 28 and 29. The spring steel U-nut 58 is shown by itself in FIG. 29 and is designed to simply slip over the side of the combined brackets 22 and shims 32 as illustrated. The spring steel U-nut 58 incorporates a clearance hole in its top and an upset hole in its bottom that is configured to grip the threads of the screw.

To install the invention, the valve 40 is slid into the valve stem cushion 38 and the assembled clip 20 is manually bent into an arc shape, as shown in FIG. 6, and snapped into the hand hole 30 of the outer truck wheel rim. The clip 20 on the outer wheel therefore stabilizes the valve 40 installed on the inner truck wheel rim. FIG. 8 depicts this relationship of the truck inner and outer wheel 28 to the valve 40 and clip 20.

While the invention has been described in complete detail and pictorially shown in the accompanying drawings, it is not to be limited to such details, since many changes and modifications may be made to the invention without departing from the spirit and scope thereof. For example, the clip 20 can also be used in combination with an extended non-reverse mounted valve stem. Hence, it is described to cover any and all modifications and forms which may come within the language and scope of the appended claims.

The invention claimed is:

1. A dual-wheel valve stem stabilizing clip for mounting on an outer rim of a dual truck wheel to immobilize a reverse-mounted valve mounted on an inner rim of a dual truck wheel comprising:
    a) a pair of U-shaped spring brackets, each having an S-shaped outer distal end with said brackets juxtapositioned on top of each other having the outer distal ends opposed, wherein each bracket further having a plurality of adjustment holes therethrough such that the holes align with each other when placed together, thereby permitting a variation in overall length,
    b) a spring doubler shim configured in a U-shape having extending legs, said shim positioned on top of each spring bracket adjacent to said outer distal end, said shim further having a single mounting hole in each leg configured to interface with a specifically selected spring bracket adjustment hole for adjusting the desired length to fit a specific truck wheel and to provide additional rigidity to the spring brackets,
    c) a valve stem cushion compressed within said spring brackets and shim legs for tightly receiving and securing the reverse-mounted valve, and
    d) a plurality of threaded fasteners attaching said spring brackets and shims together to form a clip capable of being manually bent in an arc shape and snapped into a hand hole of the outer rim of the dual truck wheel to stabilize the reverse-mounted valve stem.

2. The dual-wheel valve stem stabilizing clip as recited in claim 1 wherein said shim legs are separated from each other when positioned on top of each spring bracket to accommodate a specific overall length.

3. The dual-wheel valve stem stabilizing clip as recited in claim 1 wherein each spring bracket is fabricated of spring steel having a material thickness of from 0.020 inch (0.050 cm) to 0.030 inch (0.076 cm).

4. The dual-wheel valve stem stabilizing clip as recited in claim 1 wherein each spring bracket incorporates a black oxide finish.

5. The dual-wheel valve stem stabilizing clip as recited in claim 1 wherein said adjustment holes further comprise an equal spacing between the holes to permit adjustment in overall length and to accommodate an equal relationship of said spring doubler shims.

6. The dual-wheel valve stem stabilizing clip as recited in claim 1 wherein each spring doubler shim is fabricated of spring steel having a material thickness of from 0.020 inch (0.050 cm) to 0.030 inch (0.076 cm).

7. The dual-wheel valve stem stabilizing clip as recited in claim 1 wherein each doubler shim incorporates a black oxide finish.

8. The dual-wheel valve stem stabilizing clip as recited in claim 1 wherein said valve stem cushion further comprises a hose that is cut into a section and compressed together to fit in-between the legs of said brackets and shims.

9. The dual-wheel valve stem stabilizing clip as recited in claim 1 wherein said threaded fasteners further comprise a cap screw and wing nut.

10. The dual-wheel valve stem stabilizing clip as recited in claim 1 wherein said threaded fasteners further comprise a cap screw and hex nut.

11. A dual-wheel valve stem stabilizing clip for mounting on an outer rim of a dual truck wheel to immobilize a reverse-mounted valve mounted on an inner rim of a dual truck wheel comprising:

a) a spring steel bracket configured to snap into a hand hole of the outer rim of the dual truck wheel with sufficient integrity to withstand over the road shock and vibration, and b) a resilient valve stem cushion disposed within said bracket such that the reverse mounted valve stem is securely gripped, thus precluding movement of the stem during truck operation.

12. The dual-wheel valve stem stabilizing clip as recited in claim 11 wherein said bracket is formed from a pair of U-shaped spring brackets contiguously engaging each other and connected together, thereby permitting adjustment in length for accommodating the dual truck wheel outer rim hand holes having different sizes.

13. The dual-wheel valve stem stabilizing clip as recited in claim 12 further comprising said bracket having an adjustable length for accommodating different size hand holes in the truck outer wheel.

14. The dual-wheel valve stem stabilizing clip as recited in claim 11 further comprising at least one shim superimposed on said bracket for providing rigidity to the spring bracket.

15. A dual-wheel valve stem stabilizing clip for immobilizing a reverse-mounted valve that is mounted on dual truck inner wheel comprising:

a) a bracket having the ability to snap into a hand hole of a dual truck outer wheel, wherein said bracket having an adjustable length for accommodating different size hand holes in the truck outer wheel, and b) a resilient valve stem cushion disposed within said bracket and interfacing with said bracket such that the reverse-mounted valve stem may be securely gripped by said cushion, thus precluding movement of the stem during truck operation.

* * * * *